(12) United States Patent
Yun

(10) Patent No.: US 7,755,992 B2
(45) Date of Patent: Jul. 13, 2010

(54) METHOD AND APPARATUS FOR CONTROLLING TILT IN AN OPTICAL DISC DEVICE

(75) Inventor: Yeo Han Yun, Pyungtaek-si (KR)

(73) Assignee: LG Electronics Inc., Seoul (KR)

( * ) Notice: Subject to any disclaimer, the term of this patent is extended or adjusted under 35 U.S.C. 154(b) by 803 days.

(21) Appl. No.: 11/131,226

(22) Filed: May 18, 2005

(65) Prior Publication Data
US 2005/0259545 A1    Nov. 24, 2005

(30) Foreign Application Priority Data
May 19, 2004   (KR) ..................... 10-2004-0035708

(51) Int. Cl.
*G11B 7/00* (2006.01)
(52) U.S. Cl. ............... 369/53.19; 369/44.32; 369/53.14
(58) Field of Classification Search ............ None
See application file for complete search history.

(56) References Cited

U.S. PATENT DOCUMENTS

| 5,001,690 | A | * | 3/1991 | Kamiya et al. | ............ | 369/44.32 |
| 5,898,654 | A | | 4/1999 | Shimada et al. | ........... | 369/44.32 |
| 6,160,772 | A | * | 12/2000 | Muramatsu | ............... | 369/44.32 |
| 6,363,039 | B2 | * | 3/2002 | Hayashi et al. | .......... | 369/44.32 |
| 7,116,610 | B2 | * | 10/2006 | Ninomiya et al. | ........ | 369/44.32 |
| 7,218,588 | B2 | | 5/2007 | Arakawa | | |
| 2003/0099171 | A1 | * | 5/2003 | Ito | ........................... | 369/44.32 |
| 2003/0142598 | A1 | | 7/2003 | Chou et al. | | |
| 2003/0210627 | A1 | | 11/2003 | Ijtsma et al. | | |
| 2004/0057353 | A1 | * | 3/2004 | Ohno et al. | ............... | 369/44.32 |
| 2004/0090619 | A1 | * | 5/2004 | Choi | .......................... | 356/153 |
| 2005/0007904 | A1 | | 1/2005 | Ishiyama et al. | | |
| 2005/0025011 | A1 | | 2/2005 | Gabryjelski | | |
| 2005/0259544 | A1 | * | 11/2005 | Park | ........................ | 369/53.19 |
| 2005/0259545 | A1 | | 11/2005 | Yun | | |

FOREIGN PATENT DOCUMENTS

CN            1484228 A          3/2004

OTHER PUBLICATIONS

Office Action dated Jul. 28, 2008 issued in connection with U.S. Appl. No. 11/131,224.

* cited by examiner

*Primary Examiner*—Christopher R Lamb
*Assistant Examiner*—Joseph H Feild
(74) *Attorney, Agent, or Firm*—Ked & Associates LLP

(57) ABSTRACT

A method and apparatus for controlling tilt in an optical disc device are provided. The method includes determining tilt offset values corresponding to different positions of an optical disc for a first tilt control mode, and deciding whether to switch to a static tilt control mode, based on a difference between the detected tilt offset values. If the disc is subject to defect management, a static tilt control mode is selected so that stable focus and tracking servo operations are maintained. If the disc is not subject to defect management, a dynamic tilt control mode is selected so that tilt control optimal for the skew of the optical disc, which gradually increases towards the outer perimeter of the disc, is performed. If the difference between tilt offset values detected respectively for inner and outer peripheral areas of the disc is small when the dynamic tilt control mode is selected, the device determines that the skew is low and changes the tilt control mode to the static tilt control mode.

18 Claims, 6 Drawing Sheets

*Static Tilt Control*

*Dynamic Tilt Control*

Dynamic Tilt Control

Static Tilt Control

METHOD AND APPARATUS FOR CONTROLLING TILT IN AN OPTICAL DISC DEVICE

BACKGROUND OF THE INVENTION

1. Field of the Invention

The invention relates to a method and apparatus for controlling tilt in an optical disc device.

2. Background of the Related Art

Optical discs belonging to the CD and DVD families have been widely commercialized, and optical discs belonging to the BD (Blue-ray Disc) family are expected to be commercialized in the near future. The CD family includes optical discs, such as a CD-ROM (a read-only CD), a CD-R (a write-once CD) and a CD-RW (a rewritable CD), and the DVD family includes optical discs such as a DVD-ROM (a read-only DVD), a DVD-R (a write-once DVD) and a DVD-RW (a rewritable DVD).

Compared to CDs, DVDs have an insufficient optical margin since their track pitch is narrow and an objective lens provided in an optical pickup for DVDs has a high numerical aperture (NA). Thus, there is a need to perform a tilt control operation for controlling tilt of the objective lens by moving inner and outer sides of the objective lens vertically in opposite directions so that the recording surface of the optical disc is parallel to the objective lens.

If an optical disc is loaded in an optical disc device, such as a DVD recorder, the device performs focus and tracking servo operations, and also detects the optimal tilt offset value while varying the tilt of the objective lens. By controlling the tilt of the objective lens according to the detected tilt offset value, the optical disc device enables the recording surface of the optical disc to be parallel to the objective lens, so that data is correctly read from or written to the disc.

There are two tilt control modes, that is, a static tilt control mode and a dynamic tilt control mode. In the static tilt control mode, as shown in FIG. 1, an optimal tilt offset value (Tilt_Offset) is detected for an inner peripheral area (for example, a lead-in area) of an optical disc, and the detected tilt offset value is commonly used for all areas of the optical disc. Accordingly, the static tilt control mode is mainly used for read-only optical discs that have a relatively large optical margin.

In the dynamic tilt control mode, as shown in FIG. 2, optimal tilt offset values (Tilt_Offset #1, Tilt_Offset #2, and Tilt_Offset #3) are detected, respectively, for an inner peripheral area, a middle area, and an outer peripheral area of an optical disc, and the detected optical tilt offset values are selectively used for the inner, middle, and outer areas of the optical disc. Accordingly, the dynamic tilt control mode is mainly used for recordable optical discs that have a relatively small optical margin.

However, the following problem is caused, as shown in FIG. 3, if the dynamic tilt control mode is used while writing data on a rewritable optical disc, such as a DVD-RAM or a BD-RE (BD-rewritable), which is subject to defect management. To rewrite data, erroneously written in a defect area of the disc, in a spare area (SA) thereof, a tilt offset value (for example, Tilt_Offset #1 or #2) corresponding to the current position of an optical pickup is selectively used while performing random access to the spare area and the defect area repeatedly and alternately. An abrupt change in the tilt offset value in this procedure causes a fatal error in focus or tracking servo operations.

SUMMARY OF THE INVENTION

An object of the invention is to solve at least the above problems and/or disadvantages and to provide at least the advantages described hereinafter.

To achieve at least the above objects, in whole or in part, and in accordance with the purposes of the invention, as embodied and broadly described herein, there is provided a method for controlling tilt in an optical disc device in accordance with an embodiment of the invention that includes determining tilt offset values corresponding to different positions of an optical disc for a first tilt control mode, and deciding whether to switch to a static tilt control mode, based on a difference between the detected tilt offset values.

To further achieve at least the above objects, in whole or in part, and in accordance with the purposes of the invention, as embodied and broadly described herein, there is provided a method for controlling tilt in an optical disc device in accordance with another embodiment of the invention that includes detecting tilt offset values for different positions of an optical disc when a dynamic tilt control mode is selected, and determining whether to switch to a static tilt control mode, based on a difference between the detected tilt offset values.

To further achieve at least the above objects, in whole or in part, and in accordance with the purposes of the invention, as embodied and broadly described herein, there is provided an apparatus for controlling tilt in an optical disc device in accordance with an embodiment of the invention that includes a controller configured to determine tilt offset values for different positions of an optical disc when a dynamic tilt control mode is selected and to switch to a static tilt control mode when a difference between the determined tilt offset values is less than a reference value, and a servo unit configured to control tilt of a lens based on the resultant tilt control mode.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Figure 1:
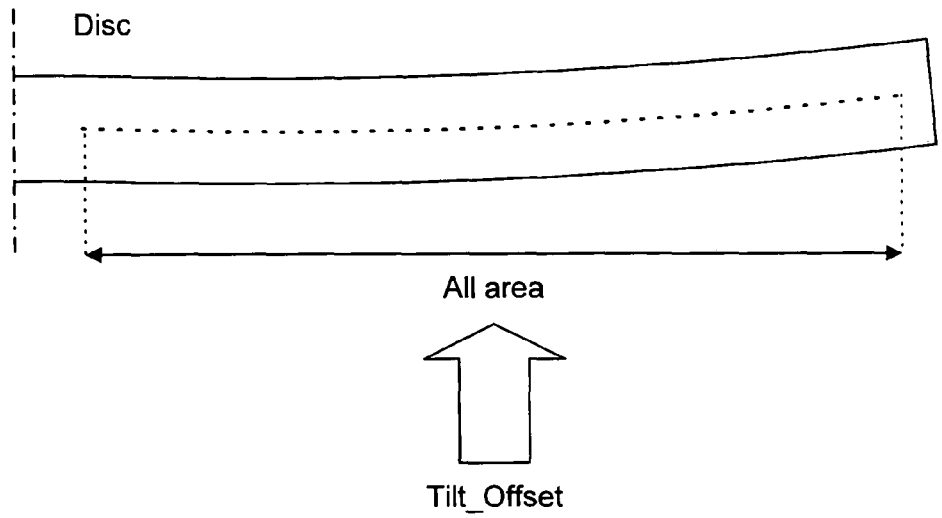
FIG. 1 is a diagram of a related art tilt control method when a static tilt control mode is selected.

Now, a method and apparatus for controlling tilt in an optical disc device according to embodiments of the invention will now be described in detail with reference to the drawings, in which like reference numerals have been used to designate like elements.

Figure 4:
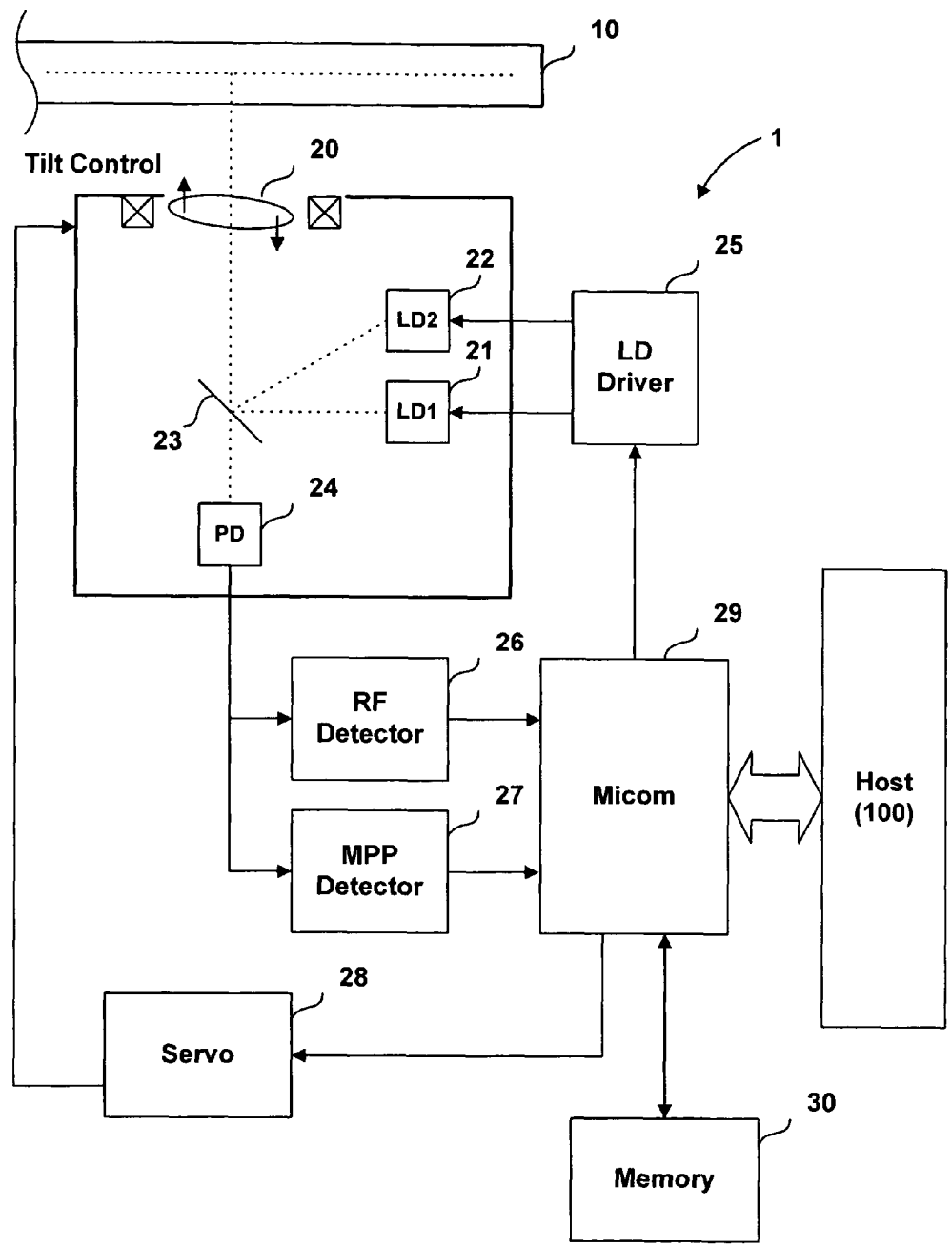
FIG. 4 is a block diagram of an optical disc device in accordance with an embodiment of the invention.

FIG. 4 is a block diagram of an optical disc device in accordance with an embodiment of the invention. As shown in FIG. 4, the optical disc device, such as a DVD recorder, includes an optical pickup 1, which includes an objective lens 20, a laser diode 21 for DVDs, a laser diode 22 for CDs, a beam splitter 23, a photo detector 24, an LD driver 25, an RF detector 26, an MPP (Main-beam Push Pull) detector 27, a microcomputer 29, a servo 28, and a memory 30.

The RF detector 26 may detect an RF signal (RF=Sa+Sb+Sc+Sd) by adding signals Sa, Sb, Sc and Sd output respectively from four divided areas A, B, C and D of the photo detector 24. The MPP detector 27 may detect an MPP signal (MPP=(Sa+Sb)−(Sc+Sd)) by selectively adding and subtracting the signals Sa, Sb, Sc and Sd output from the 4 divided areas of the photo detector 24.

If a read-only optical disc is loaded in the device, the microcomputer 29 may detect an RF signal of the optical disc using the RF detector 26 while controlling tilt of the objective lens 20 by moving inner and outer sides of the objective lens 20 vertically in opposite directions. The microcomputer 29 may detect and store a tilt control value at which the detected RF signal level is maximized, as an optimal tilt offset value for the loaded optical disc, in the memory 30.

If a write-once optical disc or a rewritable optical disc is inserted in the optical disc device, the microcomputer 29 may detect respective MPP signals for an inner peripheral area, a middle area, and an outer peripheral area of the inserted disc using the MPP detector 27 while controlling the tilt of the objective lens 20 for each of the inner, middle and outer areas of the inserted optical disc. The microcomputer 29 may store respective tilt control values at which the detected MPP signal levels for the inner, middle, and outer areas of the inserted optical disc are maximized, as respective optimal tilt offset values for the inner, middle, and outer areas, in the memory 30 in association with respective location information of the inner, middle, and outer areas.

Figure 5:
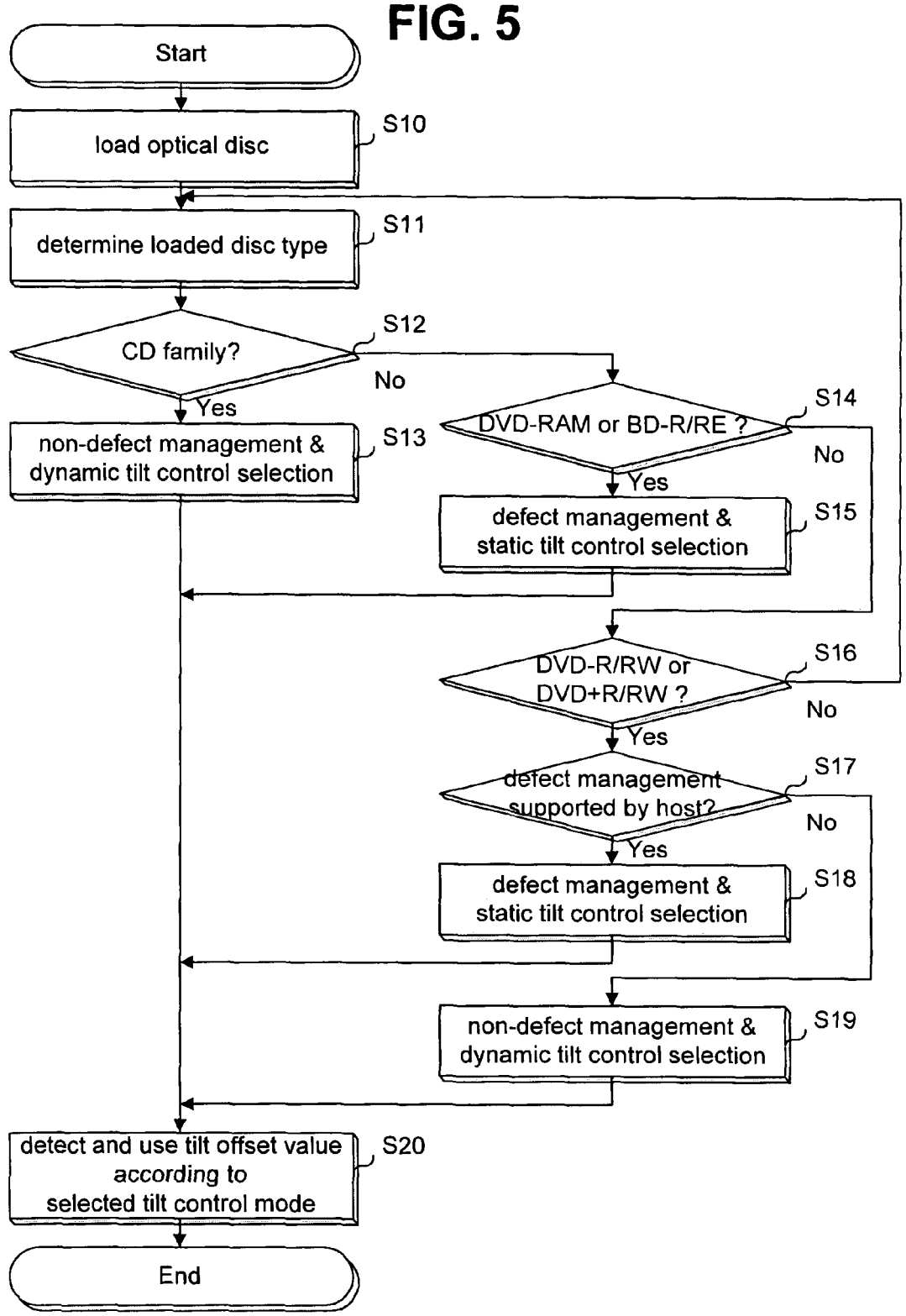
FIG. 5 is a flow chart of a method for controlling tilt in an optical disc device in accordance with an embodiment of the invention.

FIG. 5 is a flow chart of a method for controlling tilt in an optical disc device according to an embodiment of the invention. The tilt control method of FIG. 5 uses different tilt control modes according to a type of loaded optical disc and depending on whether a host connected with the device supports defect management.

If an optical disc is loaded in the optical disc device, in step S10, the microcomputer 29 determines a type of the loaded optical disc, in step S11. If the loaded optical disc belongs to the CD family, in step S12, the microcomputer 29 determines that the loaded optical disc is not subject to defect management, and selects and activates a dynamic tilt control mode so as to perform tilt control optimal for skew of the optical disc, which gradually increases towards the outer perimeter of the optical disc, in step S13.

If the loaded optical disc is, for example, a DVD-RAM, a BD-R, or a BD-RE, in step S14, the microcomputer 29 determines that the loaded optical disc is subject to defect management, and selects and activates a static tilt control mode so that stable focus and tracking servo operations are performed, in step S15. On the other hand, if the loaded optical disc is a DVD-R, a DVD-RW, or a DVD+RW, in step S16, the microcomputer 29 checks whether or not the host supports defect management.

For example, if a recording tool executed in the host supports defect management, the microcomputer 29 selects and activates the static tilt control mode, in step S18. If the recording tool executed in the host does not support defect management, the microcomputer 29 selects and activates the dynamic tilt control mode, in step S19. Whether or not the host supports defect management is determined, for example, through interfacing with the host during system startup, or is determined by a command transmitted from the host when a defect occurs.

Figure 2:
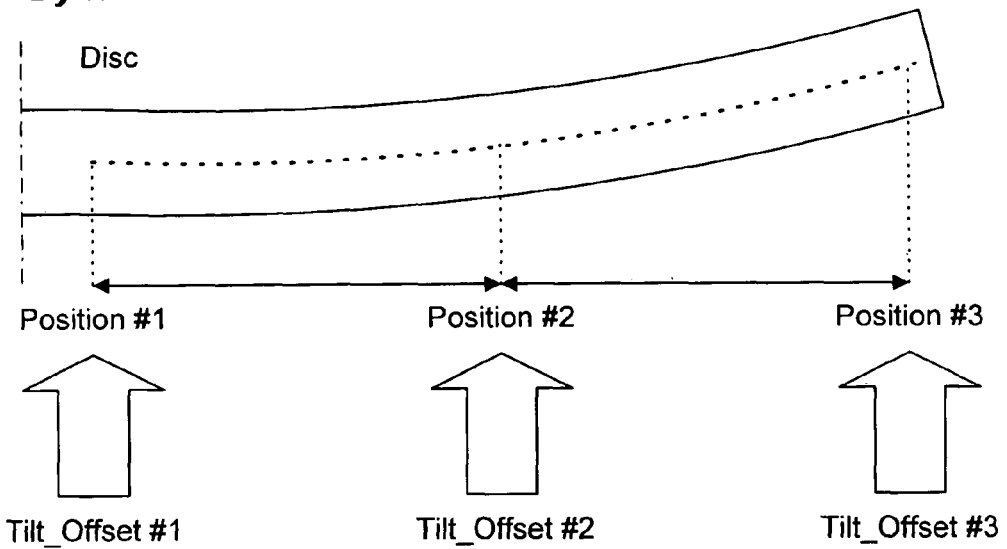
FIG. 2 is a diagram of a related art tilt control method when a dynamic tilt control mode is selected.
Figure 3:
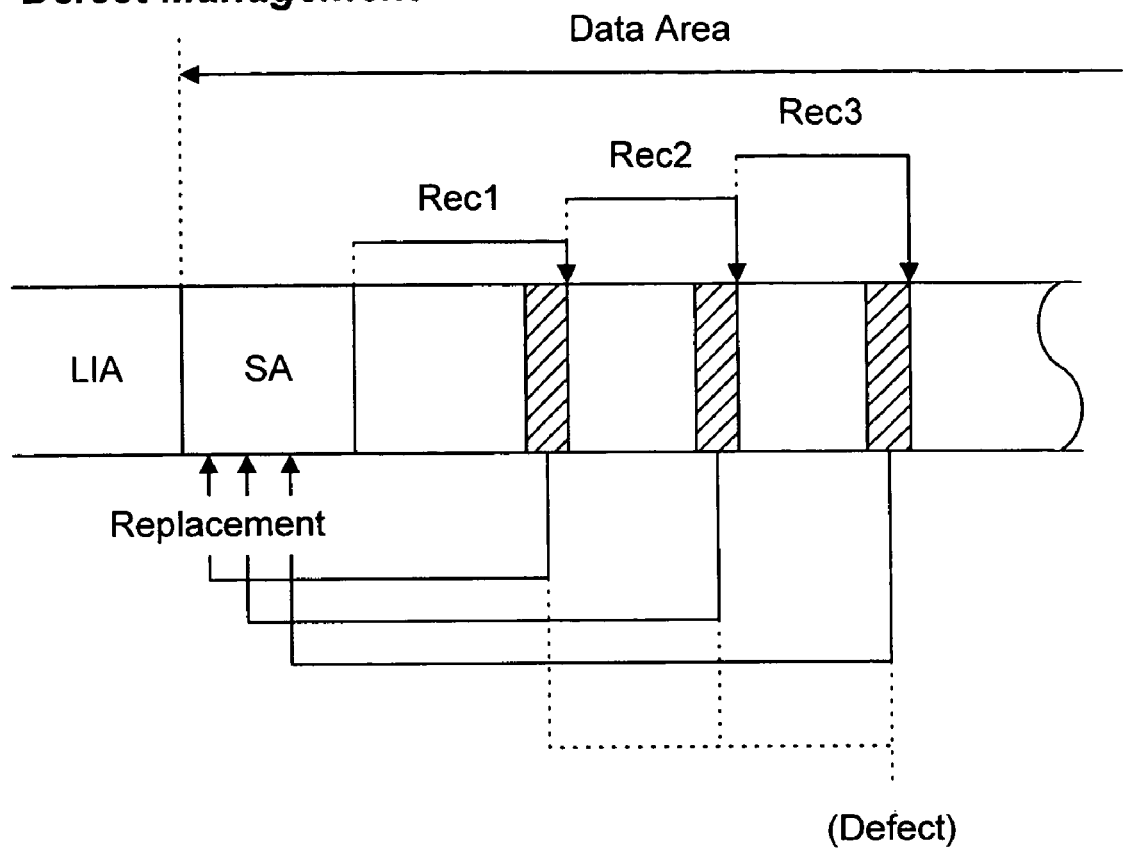
FIG. 3 is a diagram of a related art defect management operation.

If the static tilt control mode is selected and activated in the procedure described above, the microcomputer 29 detects an optimal tilt offset value for an inner peripheral area (for example, a lead-in area) of the loaded optical disc, and then commonly uses the detected tilt offset value for all areas of the disc, as described above with reference to FIG. 1. On the other hand, if the dynamic tilt control mode is selected and activated, the microcomputer 29 detects respective optimal tilt offset values for the inner, middle, and outer areas of the loaded optical disc, and then selectively uses the detected optimal tilt offset values for the inner, middle, and outer areas of the loaded optical disc, as described above with reference to FIG. 2, in step S20.

Accordingly, the optical disc device according to embodiments of the invention can select and activate the static or dynamic tilt control mode appropriately according to the type of optical disc inserted in the optical disc device and depending on whether or not the host supports defect management.

Figure 6:
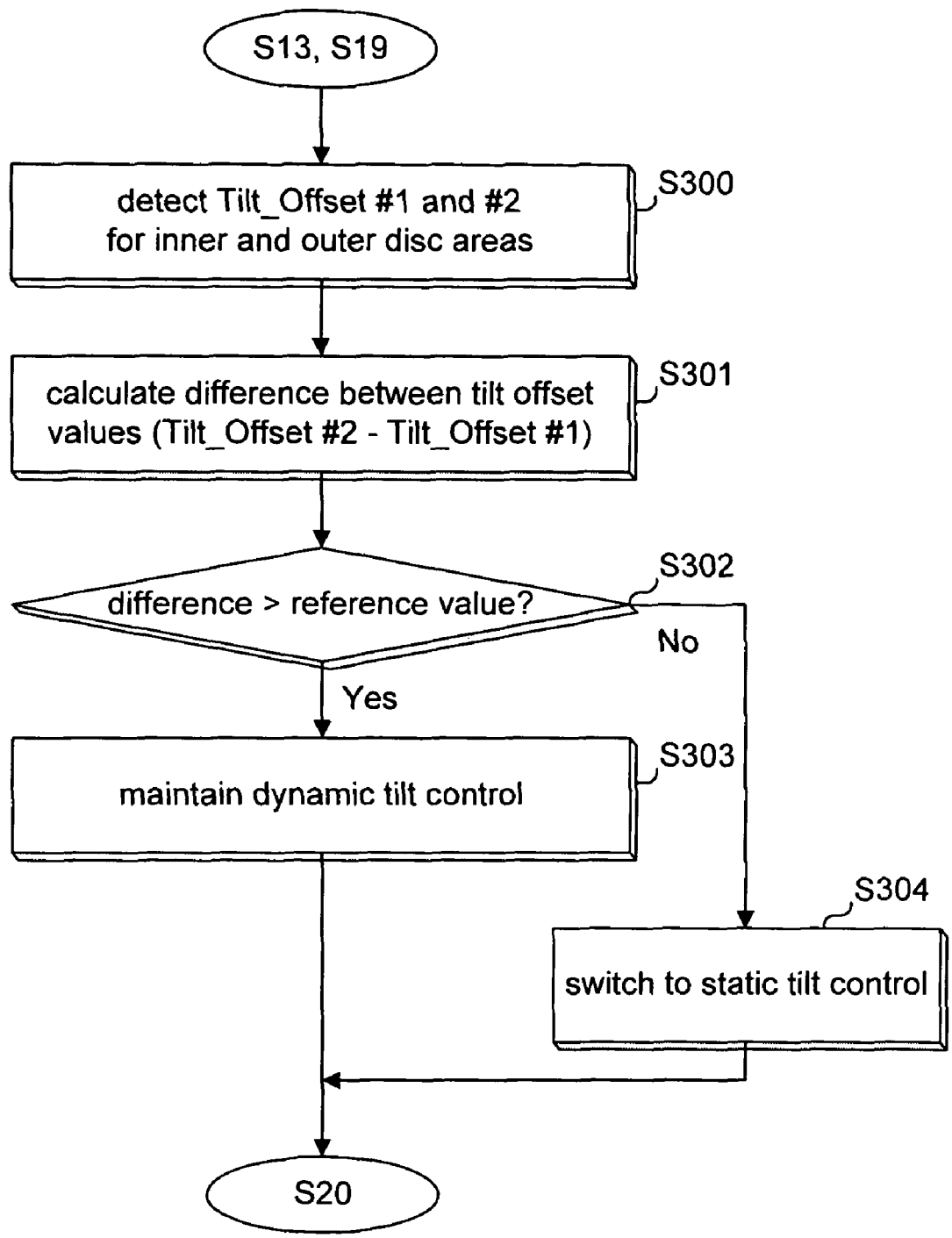
FIG. 6 is a flow chart illustrating how a dynamic tilt control mode selected in the method of FIG. 5 is switched to a static tilt control mode according to an embodiment of the invention.

According to another embodiment of the invention, as shown in FIG. 6, if the dynamic tilt control mode is selected, for example, if the loaded optical disc belongs to the CD family which is not subject to defect management, in step S13, or if the loaded optical disc is a DVD-R/RW or a DVD+R/RW and the host does not support defect management, in step S19, the microcomputer 29 detects optimal tilt offset values "Tilt_Offset #1" and "Tilt_Offset #2" for the inner and outer peripheral areas of the loaded optical disc before activating the dynamic tilt control mode, in step S300. The microcomputer 29 then calculates the difference between the detected optimal tilt offset values "Tilt_Offset #1" and "Tilt_Offset #2", in step S301.

Figure 7:
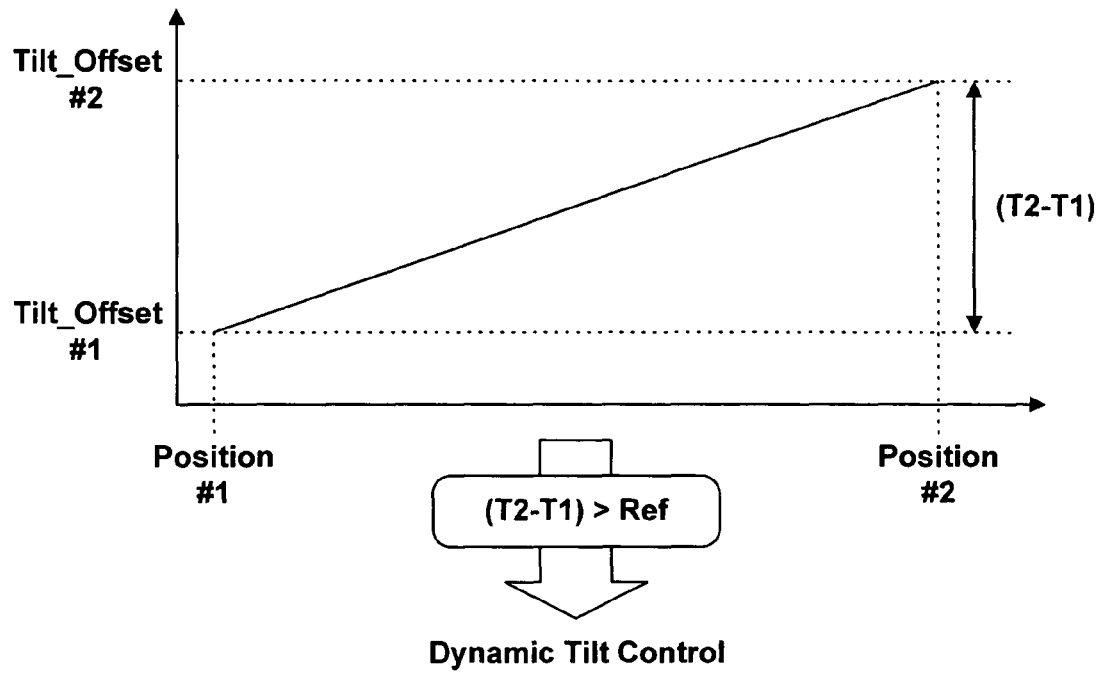
FIG. 7 is a diagram illustrating an example where a dynamic tilt control mode is selected according to an embodiment of the invention.
Figure 8:
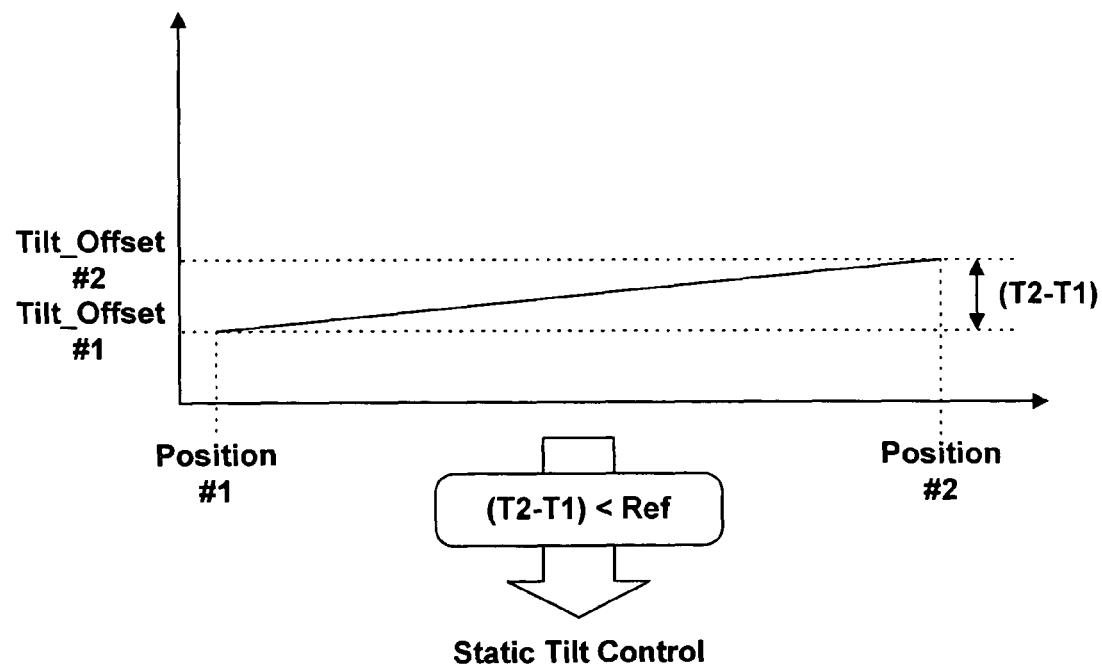
FIG. 8 is a diagram illustrating an example where a static tilt control mode is selected according to an embodiment of the invention.

If the calculated difference is greater than a preset reference value, in step S302 and as shown in FIG. 7, the microcomputer 29 determines that the skew of the loaded optical disc is high, and activates the dynamic tilt control mode, in step S303. On the other hand, if the calculated difference is less than or equal to the preset reference value, in step S302, and as shown in FIG. 8, the microcomputer 29 determines that the skew of the loaded optical disc is low, and activates the static tilt control mode, in step S304.

As in apparent from the above description, embodiments of the invention provide a method and apparatus for controlling tilt in an optical disc device, which has at least the following features and advantages.

In the methods and apparatus according to embodiments of the invention, a static tilt control mode or a dynamic tilt control mode is selectively activated depending on whether an optical disc is subject to defect management in a host, such as a personal computer, with which the device is connected.

That is, the method and apparatus for controlling tilt in an optical disc device according to embodiments of the invention perform optimal tilt control according to the type of optical disc loaded in the optical disc device and depending on whether the disc is subject to defect management in a host.

Further, the method and apparatus for controlling tilt in an optical disc device according to embodiments of the invention is capable of changing the tilt control mode according to the skew of an optical disc loaded in the optical disc device.

Thus, with embodiments of the invention, it is possible to select a suitable tilt control mode according to the type of loaded optical disc and depending on whether a host connected with the device supports defect management. The selection of a suitable tilt control mode allows maintenance of stable focus and tracking servo operations.

Further, when the optical disc device is in the dynamic tilt control mode, the control mode can be switched to the static tilt control mode if the skew of the optical disc is low, thereby maintaining the stable focus and tracking servo operations.

The foregoing embodiments and advantages are merely exemplary and are not to be construed as limiting the invention. The present teaching can be readily applied to other types of apparatuses. The description of the invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A method for controlling tilt in an optical disc device, the method comprising:
   determining tilt offset values corresponding to different positions of an optical disc for a first tilt control mode; and
   deciding whether to switch to a static tilt control mode or to maintain the first tilt control mode, based on a difference between the detected tilt offset values, wherein when the difference between the tilt offset values is greater than a predetermined reference value, the first tilt control mode is maintained and when the difference between the tilt offset values is less than or equal to the predetermined reference value, the tilt control mode is switched to the static tilt control mode, and wherein the static tilt control mode includes commonly using an optimal tilt offset value generated from the detected tilt offset values for all areas of the disc.

2. The method according to claim 1, wherein the first tilt control mode is a dynamic tilt control mode.

3. The method according to claim 1, wherein the tilt offset values are detected from the optical disk.

4. A method for controlling tilt in an optical disc device, the method comprising:
   detecting tilt offset values for different positions of an optical disc when a dynamic tilt control mode is selected; and
   determining whether to switch to a static tilt control mode or to maintain the dynamic tilt control mode, based on a difference between the detected tilt offset values, wherein the static tilt control mode includes commonly using an optimal tilt offset value generated from the detected tilt offset values for all areas of the disc.

5. The method according to claim 4, further comprising selecting the dynamic tilt control mode when the optical disc is a CD.

6. The method according to claim 4, further comprising selecting the dynamic tilt control mode when the optical disc is a DVD−R/RW or a DVD+R/RW and a host does not support defect management.

7. The method according to claim 4, wherein to obtain the difference between the detected tilt offset values, respective tilt offset values for inner and outer peripheral areas of the optical disc are detected.

8. The method according to claim 4, wherein when the difference between the tilt offset values is greater than a predetermined reference value, the selected dynamic tilt control mode is maintained, and when the difference between the tilt offset values is less than or equal to the predetermined reference value, the tilt control mode is switched to the static tilt control mode.

9. An apparatus for controlling tilt in an optical disc device, the apparatus comprising:
   a controller configured to determine tilt offset values for different positions of an optical disc when a dynamic tilt control mode is selected and to switch to a static tilt control mode when a difference between the determined tilt offset values is less than a reference value, wherein the static tilt control mode includes commonly using an optimal tilt offset value generated from the detected tilt offset values for all areas of the disc; and
   a servo device configured to control tilt of a lens based on the resultant tilt control mode.

10. The apparatus according to claim 9, further comprising a storage device configured to store tilt offset values for different positions along a radius of the optical disc in association with corresponding position information, wherein the servo device is configured to control tilt of a lens based on the selected tilt control mode and tilt offset values stored in the storage device.

11. The apparatus according to claim 10, wherein the dynamic tilt control mode is selected when the optical disc is a CD.

12. The apparatus according to claim 10, wherein the dynamic tilt control mode is selected when the optical disc is a DVD−R/RW or a DVD+R/RW and a host does not support defect management.

13. The apparatus according to claim 10, wherein when the difference between the tilt offset values is greater than a predetermined reference value, the selected dynamic tilt control mode is maintained, and when the difference between the tilt offset values is less than or equal to the predetermined reference value, the tilt control mode is switched to the static tilt control mode.

14. A method for controlling tilt in an optical disc device, the method comprising:
   determining a type of an optical disc;
   selecting a static tilt control mode when the determined type of the optical disc is at least one of a Blue-Ray R/RE Disc or a DVD-RAM, and a host supports defect management;
   selecting a dynamic tilt control mode when the determined type of the optical disc is at least one of a CD, a DVD−R/RW, or a DVD+R/RW, and the host does not support defect management;
   detecting tilt offset values for different positions of the optical disc for the dynamic tilt control mode; and
   determining whether to switch to the static tilt control mode or to maintain the dynamic tilt control mode, based on a difference between the detected tilt offset values, wherein the static tilt control mode includes commonly using an optimal tilt offset value generated from the detected tilt offset values for all areas of the disc.

15. The method according to claim 14, further comprising detecting tilt offset values for an inner peripheral area, for a middle area, and for an outer peripheral area of the optical disc, and using the detected tilt offset values selectively for the inner peripheral area, the middle area, and the outer peripheral area of the optical disc when the dynamic tilt control mode is selected.

16. The method according to claim 14, further comprising detecting a tilt offset value for an inner peripheral area of the optical disc, and using the detected tilt offset value for all areas of the optical disc when the static tilt control mode is selected.

17. The method according to claim 16, wherein the inner peripheral area of the optical disc is a lead-in-area of the optical disc.

18. The method according to claim 14, wherein when the difference between the detected tilt offset values is greater than a predetermined reference value, the selected dynamic tilt control mode is maintained, and when the difference between the tilt offset values is less than or equal to the predetermined reference value, the tilt control mode is switched to the static tilt control mode.

* * * * *